United States Patent
Sumanaweera

(10) Patent No.: US 6,843,770 B2
(45) Date of Patent: Jan. 18, 2005

(54) COMPOUND TUNING METHOD AND SYSTEM

(75) Inventor: Thilaka S. Sumanaweera, Los Altos, CA (US)

(73) Assignee: Acuson Corporation, Mountain View, CA (US)

(*) Notice: Subject to any disclaimer, the term of this patent is extended or adjusted under 35 U.S.C. 154(b) by 218 days.

(21) Appl. No.: 10/180,382

(22) Filed: Jun. 26, 2002

(65) Prior Publication Data

US 2004/0002651 A1 Jan. 1, 2004

(51) Int. Cl.[7] .................................................. A61B 8/00
(52) U.S. Cl. ...................................................... 600/447
(58) Field of Search ................................. 600/447, 443, 600/441, 454–459, 437; 128/916; 73/625–626; 382/128, 130–131, 260–261, 265, 294, 302

(56) References Cited

U.S. PATENT DOCUMENTS

| | | | |
|---|---|---|---|
| 4,887,306 A | * 12/1989 | Hwang et al. | 382/261 |
| 5,357,580 A | * 10/1994 | Forestieri et al. | 382/128 |
| 5,503,153 A | * 4/1996 | Liu et al. | 600/454 |
| 5,595,179 A | * 1/1997 | Wright et al. | 600/443 |
| 5,865,752 A | * 2/1999 | Seyed-Bolorforosh et al. | 600/454 |
| 5,961,460 A | 10/1999 | Guracar et al. | |
| 6,014,473 A | 1/2000 | Hossack et al. | |
| 6,048,316 A | 4/2000 | Zhao et al. | |
| 6,120,453 A | 9/2000 | Sharp | |
| 6,193,663 B1 | 2/2001 | Napolitano et al. | |
| 6,352,508 B1 | 3/2002 | Pang et al. | |
| 6,364,835 B1 | 4/2002 | Hossack et al. | |
| 6,423,003 B1 | * 7/2002 | Ustuner et al. | 600/443 |

OTHER PUBLICATIONS

"Quantitative Three–Dimensional Echocardiography by Rapid Imaging from Multiple Transthoracic Windows: In Vitro Validation and Initial In Vivo Studies," by Daniel F. Leotta, MS, Brad Munt, MD, Edward L. Bolson, MS, Carol Kraft, RDCS, Roy W. Martin, PhD, Catherine M. Otto, MD, and Florence H. Sheehan, MD, Seattle, Washington; Journal of the American Society of Echocardiography, Oct. 1997, vol. 10, No. 8, pp. 830–839.

* cited by examiner

*Primary Examiner*—Francis J. Jaworski

(57) ABSTRACT

Compounding of data representing a same location is provided. The level of compounding is tuned. Different levels of compounding between averaging and selecting a maximum or minimum and/or between minimum and maximum are provided. Ultrasound data to be compounded is weighted. The weights are defined by a smoothly varying functions from a zero value to a unity value or one. The weight for each of the data to be compounded is a function of all of the data to be compounded. One or more variables in the weighting function allows selection of the level of compounding. As a result of these weighting characteristics, a compromise or tuned level of compounding between minimum and selection of a maximum value is provided.

36 Claims, 1 Drawing Sheet

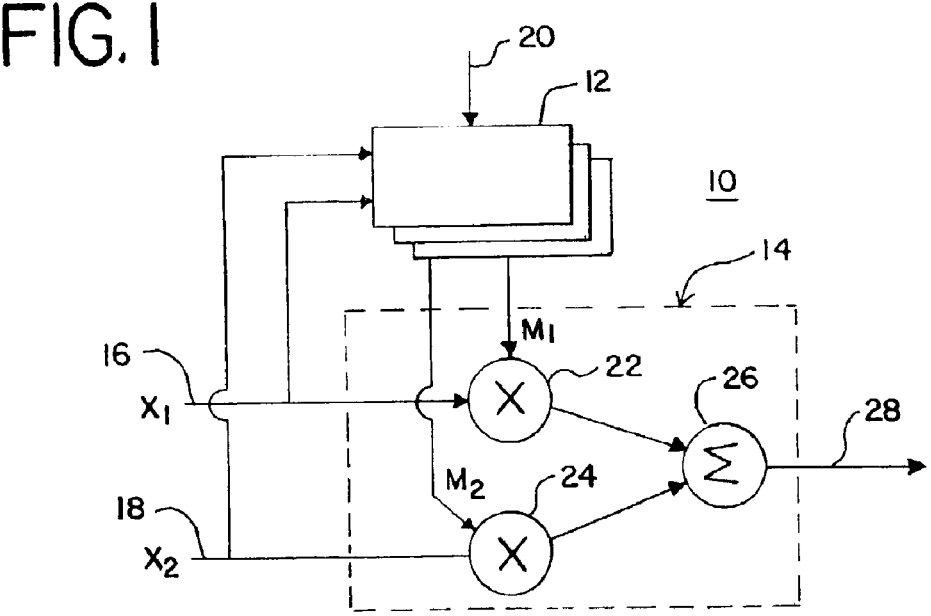
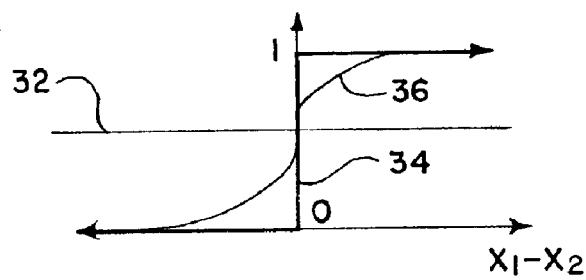
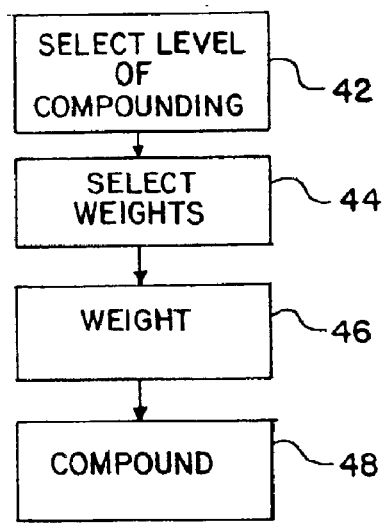

COMPOUND TUNING METHOD AND SYSTEM

BACKGROUND

The present invention relates to compounding data representing a same spatial location. In particular, the level of compounding is tuned or selected.

For ultrasound imaging, frames of data representing overlapping or a same field of view are compounded. For example, frames of data associated with different steering angles from a same transducer are compounded together. Some parts of two or more frames of data represent same spatial locations. As another example, images are acquired as a transducer is translated. The images are compounded together to represent an extended field of view. As yet another example, frames of data representing a same field of view at different frequencies or in response to other differences in imaging parameters are combined. Due to spatial or frequency differences, the compounding may provide speckle variance reduction.

The ultrasound data is compounded in one of various ways. For example, data representing a same spatial location is averaged. As another example, the maximum or minimum value of a plurality of values representing the same spatial location is selected. The results of the selection or averaging are used for further processing, such as generating an image of the compounded data. Where bright structures are visible only in some of the component images, the structures may be smeared or missing due to averaging. Speckle variance based on averaging is low. Where a maximum value is selected, bright structures remain visible but speckle texture is maintained, leading to a twinkling effect, an effect that is aesthetically discomforting, when multiple images are displayed sequentially.

BRIEF SUMMARY

The present invention is defined by the following claims, and nothing in this section should be taken as a limitation on those claims. By way of introduction, the preferred embodiments described below include methods and systems for compounding data representing a same spatial location. The level of compounding is tuned. Different levels of compounding between averaging and selecting a maximum or minimum are provided. Different levels of compounding between maximum and minimum is also provided. Ultrasound data to be compounded is weighted. The weights are defined by a smoothly varying function from a zero value to a unity value or one. The weight for each of the data to be compounded is a function of all of the data to be compounded. A variable in the weighting function allows selection of the level of compounding. As a result of these weighting characteristics, a compromise or tuned level of compounding between averaging and selection of a maximum value is provided. The tuning can also be performed between averaging and minimum or between minimum and maximum.

In a first aspect, a method for compounding ultrasound data representing a same spatial location is provided. First and second data are weighted as a function of first and second weights, respectively. Each of the first and second weights are responsive to both of the first and second data. The weighted first and second data is then compounded. In other aspects, a system with a memory and filter for weighting and compounding as described above is provided.

In a second aspect, a method for compounding ultrasound data representing a same spatial location is provided. First and second data are weighted as a function of first and second weights, respectively. The first and second weights are responsive to a first function that varies smoothly from a zero value to a unity value. The weighted first and second data is compounded. In other aspects, a system including a memory and filter for weighting and compounding as described above is provided.

In a third aspect, another method of compounding ultrasound data representing a same spatial location is provided. A level of compounding within a range or continuum between averaging and selecting a maximum of first and second data is selected in response to user input. The first and second data is compounded as a function of the selected level of compounding. The tuning can also be performed between averaging and minimum or between minimum and maximum.

Further aspects and advantages of the invention are discussed below in conjunction with the preferred embodiments.

BRIEF DESCRIPTION OF SEVERAL VIEWS OF THE DRAWINGS

The components in the figures are not necessarily to scale, emphasis instead being placed upon illustrating the principles of the invention. Moreover, in the figures, like reference numerals designate corresponding parts throughout the different views.

FIG. 1 is a block diagram of one embodiment of a system for compounding data representing a same spatial location.

FIG. 2 is a graphical representation of one embodiment showing a weighting function.

FIG. 3 is a flowchart diagram of one embodiment for compounding data representing a same spatial location.

DETAILED DESCRIPTION OF THE PREFERRED EMBODIMENTS

A continuum of levels of compounding between averaging and selecting a maximum or minimum is provided by a weighting function. By having weights based on a function that smoothly varies from a zero value to a unity or one value and/or weights that are each a function of multiple of the data to be combined, more robust compounding is provided.

The tunable compounding discussed herein is applicable to any of various imaging technologies. In one embodiment, the compounding is provided for ultrasound data. A medical diagnostic ultrasound system, such as the Elegra® or the Sequoia® systems manufactured by Siemens Medical Solutions USA, Inc. ultrasound group and Acuson—a Siemens company, respectively, are used. Other ultrasound systems by the same or other manufacturers may be used. In other embodiments, the compounding is provided for magnetic resonance imaging, computed tomography imaging, 2D x-ray imaging, single positron emission computed tomography, positron emission tomography or for other systems capable of generating multiple values representing a same spatial location.

FIG. 1 shows one embodiment of a system 10 for compounding data representing a same spatial location. The system 10 includes a memory 12 and a filter 14. The memory 12 is shown separate from the filter 14, but may be included as part of the filter 14. For example, the system 10 comprises a digital signal processor, general processor, application specific integrated circuit or other digital device for finite impulse response filtering. In alternative embodiments, entirely analog or combinations of analog and digital devices are provided for the system 10. In yet other alternative embodiments, the system 10 is implemented as a software program on a processor.

The system 10 includes two or more data inputs 16, 18. In alternative embodiments, a single data input for sequentially receiving multiple data values is provided. Ultrasound data or other data representing a same spatial location are provided on the inputs 16, 18. As used herein, a same spatial location includes data associated with a substantially same, slightly divergent or same spatial location. For example, data associated with different scan patterns may have a resulting spatial difference or misalignment, but may still represent the same spatial location. The data is input on the inputs, 16, 18 at a same time, but may be input at different times. Different data representing different spatial locations are sequentially input into the system 10 for compounding over a field of view or for a frame of data. More than two data inputs may be used.

The memory 12 is a lookup table, multiplier buffer, filter buffer, processor buffer, or other memory for storing two or more weights. The stored weights are associated with a selected level of compounding.

The weights within the memory 12 are responsive to a function that varies smoothly from a zero value to a unity value. Both averaging and selection of a maximum value are expressed as a normalized weighted combination as follows:

$$I = \frac{x_1 m_1 + x_2 m_2}{m_1 + m_2}, \tag{3}$$

where $x_1$ and $x_2$ are first and second data input to the system 10 and $m_1$ and $m_2$ are two weight values. For the averaging operation, $m_1 = m_2$. For the selection of the maximum value, the weights are defined using the sign (signum) function:

$$m_1 = \frac{1}{2}[1 + \text{sign}(x_1 - x_2)] \tag{5}$$

$$m_2 = \frac{1}{2}[1 + \text{sign}(x_2 - x_1)], \tag{6}$$

where the signum function is defined as:

$$\text{sign}(x) = \begin{cases} +1 & \text{if } x > 0 \\ -1 & \text{if } x < 0 \\ \text{undefined or } 0 & \text{if } x = 0. \end{cases} \tag{7}$$

FIG. 2 represents the average function as a horizontal line 32 through a 0.5 or ½ amplitude level. Where two data values are combined, the average weighting function is ½ for each of the weights. The selection of the maximum is represented by line 34. If the difference between the two input values is positive, then one weight is selected as one or unity and where the difference is negative, then the weight is selected as a zero value. To achieve a continuum of levels of compounding between averaging and selection of the maximum value, the signum function or average function is replaced with a function that varies smoothly from a zero value to a unity value. For example, FIG. 2 shows a Fermi-Dirac function at 36 and mathematically represented as:

$$F(x) = \frac{1}{1 + e^{-xa}}, \tag{8}$$

Other functions that smoothly vary from a zero value to a unity value may be used, such as an inverse arc tangent function, an integral of a Gaussian function, a tanh function, other exponential function, other logarithmic function, an arbitrary look-up table, or any other function that has a smooth transition from the zero to one values. As used herein, a smooth transition provides no right angles or substantial angles, such as a monotonic function, a function where the first and/or higher order derivatives are continuous or other gradually changing function. FIG. 2 shows the smooth transition function at curving line 36. Defining the weights in $m_1$ and $m_2$ as responsive to the Fermi-Dirac function:

$$m_1 = \frac{1}{1 + e^{-(x_1 - x_2)a}}, \text{ and} \tag{9}$$

$$m_2 = \frac{1}{1 + e^{-(x_2 - x_1)a}}. \tag{10}$$

where a is a variable defining a level of compounding. As the value of $x_1$ becomes greater than $x_2$, the value of $m_1$ is greater than $m_2$.

Each of the weights $m_1$ and $m_2$ are responsive to both input data values, $x_1$ and $x_2$. One weight is a function of the difference of a second data value subtracted from first data value, and the other weight is a function of the difference of the first data value subtracted from the second data value. Other functions with different mathematical relationships between the two data values may be used. If "a" is not infinity or negative infinity and neither of the input data values represent infinity or negative infinity, both weights $m_1$ and $m_2$ represent non-zero or non-unity values, unlike weights for selecting a maximum or minimum value. In alternative embodiments, the weights approximate the smoothly varying function and may have 0 or 1 values.

The variable "a" within each of the weighting functions determines the level of compounding. Additional variables may be used, such as variables for additional control. Different values of "a" provide different amounts of compounding within the range of averaging to the maximum selection operation. For example, using the Fermi-Dirac function discussed above, a=0.0 corresponds to averaging while α→∞ corresponds to selecting a maximum value. Any value of the variable "a" between these two limits corresponds to an amount of compounding between averaging and selection of the maximum. Variables with different functional relationships with the weights $m_1$ and $m_2$ may be used.

In implementation, the level of compounding variable is selected as a function of the imaging application or in response to the user input. In one embodiment, multiple lookup tables within the memory 12 are provided, where each lookup table represents weighting values associated with a different level of compounding value. As shown in FIG. 1, each lookup table is addressed by the values of the data to be compounded. The level of compounding is selecting in response to input on line 20. In alternative embodiments, the lookup table is responsive to three inputs, such as the two data values and the level of compounding input. In other embodiments, a processor performs the mathematical operations for determining the weights in real time. In yet other embodiments, a single lookup table associated with just one level of compounding is provided. The weights within each of the lookup tables are responsive to both of the data values to be combined and are determined by or represent the smoothly varying function.

In the embodiment discussed above, two data values representing a same spatial location are combined. In other embodiments, three or more data values representing a same spatial location are combined. For these embodiments, the compounded image or compounded value is given by:

$$I = \frac{m_1 I_1 + \ldots + m_N I_N}{m_1 + \ldots + m_N}, \tag{12}$$

where the weights are given by:

$$m_k = \prod_{\substack{i=1 \\ i \neq k}}^{N} \frac{1}{1 + e^{-(I_k - I_i)a}}. \tag{13}$$

The filter 14 includes multipliers 22, 24 and an adder 26. The multipliers 22, 24 and adder 26 comprise separate digital or analog devices, a combined digital or analog device or a processor. The multipliers or software weight the input data. For example, one multiplier 22 weights one data value, $x_1$, with a weight $m_1$. The data value is multiplied by the weight. Other functions may be used, such as dividing the data value by the weight. The other data value, $x_2$, is multiplied by the second weight $m_2$ by the other multiplier 24. The adder 26 sums the weighted data values from the two multipliers 22 and 24. The output data 28 represents compounded data. For compounding additional or three or more values, a cascaded filter structure or a filter with three or more taps may be used. Other types of software or hardware filtering with differing response characteristics may also be used.

FIG. 3 shows a method of one embodiment for compounding data representing a same spatial location. In act 42, the level of compounding is determined. The weights are then selected in act 44. The input data is weighted in act 46. In act 48, the weighted data is compounded. Additional, fewer or different acts may be provided.

The level of compounding is selected in act 42 in response to user input, such as indirectly by selecting an imaging application or as directly selecting a level of compounding or variable value, automatic or software selection, experimentation, a manufacturer set compounding level, or other selection criteria. In one embodiment, the user selects or changes the level of compounding to generate desired images. The level of compounding variable or the weighting function is set in response to the selected level of compounding.

In act 44, the weights are selected and are a function of the smoothly varying function from zero to one. Each data value to be combined is associated with a determined weight, the weights have same or different values. Each of the different weights are a function of both multiple or all of the data values to be combined. In response to the selected level of compounding and the input data values, the different weights are selected or generated.

In act 46, the input data values are weighted by the associated weights. In act 48, the weighted data values are compounded.

The embodiments discussed above may be used for combining ultrasound data. For example, five component images or frames of data associated with spatial compounding are acquired. Component images comprise scan converted data or data prior to scan conversion. Each component image is associated with a different steering angle from the transducer. At least a portion of each component image represents same spatial locations as represented by the other component images. In one embodiment, the level of compounding variable "a" is set to one of 0.0, 0.001, 0.0025, 0.005, 0.0075, and 0.01 but other values may be used. The level of compounding variable a set to 0.0 provides averaging the component images. For example, where all five frames represent a same spatial location, each weight is a $\frac{1}{5}$ value. Where spatial locations are represented by four or fewer frames of data, the weights are adjusted accordingly for normalization, such as $\frac{1}{4}$, $\frac{1}{3}$, $\frac{1}{2}$ and $\frac{1}{4}$, for 4, 3, 2, and 1 component images. When the level of compounding variable "a" approaches infinity, the weights correspond generally to selection of a maximum value of the component images. For example, for one spatial location, the maximum of the five frames of data representing that same spatial location is selected as an output. For any value of the level of compounding variable "a" between zero and infinity, a level of compounding between averaging and selection of the maximum is provided.

Where averaging is provided, certain structures visible in only one or fewer than all of the component images may not be visible or as visible in the compounded information. As the level of compounding variable "a" is increased, the structures become more visible in the compounded image. As the level of compounding variable "a" approaches infinity, the speckle effect may cause a twinkling or undesirable artifact. By choosing the level of compounding variable "a" to be a value other than zero or infinity, such as 0.0025, a compromise level of compounding providing some of the benefits of averaging and selection of a maximum without the same level of disadvantages is provided. The weights used for compounding are responsive, in part, to both of the maximum and averaging functions. In alternative embodiments, extended field of view imaging or frequency compounding use the tuned level of compounding discussed above. Any method or system that combines two or more data values may use the methods and systems described herein for compounding.

In another embodiment, any level of compounding between minimum and maximum can be achieved by using the present method. When $\alpha \rightarrow -\infty$, the method produces a data point that is the minimum of the component data points. When $\alpha \rightarrow \infty$, the method produces a data point that is the maximum of the component data points. When $\alpha=0$, the method produces a data point that is the average of the component data points.

In another embodiment, the weights are selected as a function of characteristics of a frame of data. For example, one weight is selected as a function of a datum and a characteristic of data of the frame of data associated with the datum. In this example, $$m_1 = 1/(1 + exp(-(x_1 - \mu_1)/\sigma_1)) \tag{14}$$

$$m_2 = 1/(1 + exp(-(x_2 - \mu_2)/\sigma_2)) \tag{15}$$

where $\mu_1$ and $\mu_2$ are the means of each frame of data or sub-sets of the frames of data and $\sigma_1$ and $\sigma_2$ are the standard deviations of each frame of data or sub-sets of the frames of data. Other gradient or characteristics of the frames of data may be used for tuning the level of compounding.

While the invention has been described above by reference to various embodiments, it should be understood that many changes and modifications can be made without the departing from the scope of the invention. For example different filters and memory structures may be provided. While selecting a level of compounding and tuning the level of compounding are discussed above, weights associated with a selected level of compounding may be provided without active selection by a user or the system, such as associated with a programmed level of compounding.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for compounding ultrasound data representing a same spatial location, the method comprising:
   (a) weighting first and second data as a function of first and second weights, respectively, the first and second weights each a function of both the first and second data, the first and second weights being other than zero values; and
   (b) compounding weighted first and second data;
   wherein the first and second data correspond to: different steering angles intersecting the spatial location, translation of a transducer between acquisitions, data at different frequencies or differences in imaging parameters.

2. The method of claim 1 wherein the first and second weights are responsive to a function that varies smoothly from a zero value to a unity value as a first function of a difference between the first and second data.

3. The method of claim 2 wherein the first function comprises a Fermi-Dirac function.

4. The method of claim 1 wherein (a) comprises weighting with the first weight responsive to a first difference of the second datum from the first datum and weighting with the second weight responsive to a second difference of the first datum from the second datum.

5. The method of claim 1 further comprising:
   (c) selecting the first and second weights as a function of a variable, the variable operable to control a level of compounding, the level operable to be selected within a range from and including a minimum to a maximum of the first and second data as a function of the variable, the range excluding values greater than the maximum and less than the minimum.

6. The method of claim 5 wherein (c) comprises selecting the variable as a function of an imaging application.

7. The method of claim 1 further comprising:
   (c) weighting third data as a function of a third weight, wherein the first, second and third weights are each responsive to all of the first, second and third data;
   wherein (b) comprises compounding the weighted first, second and third data.

8. The method of claim 1 wherein (b) comprises adding the weighted first datum with the weighted second datum.

9. The method off claim 1 wherein the first and second data correspond to data acquired at different steering angles relative to the spatial location.

10. The method of claim 1 wherein the first and second data correspond to data acquired at different transducer positions based on translation of the transducer.

11. The method of claim 1 wherein the first and second data correspond to data at different frequency bands.

12. A system for compounding ultrasound data representing a same spatial location, the system comprising:
    a memory for storing first and second weights, the memory having first and second inputs for receiving first and second data, the first and second weights each responsive to both the first and second data, the first and second weights being other than zero values; and
    a filter for weighting the first and second data with the first and second weights, respectively, and for compounding the weighted first and second data;
    wherein the first and second data correspond to: different steering angles intersecting the spatial location, translation of a transducer between acquisitions, data at different frequencies or differences in imaging parameters.

13. The system of claim 12 wherein the first and second weights are responsive to a function that varies smoothly from a zero value to a unity value as a function of a difference between the first and second data.

14. The system of claim 12 wherein the memory comprises a look-up table of weights.

15. The system of claim 12 wherein the memory comprises a multiplier buffer.

16. The system of claim 12 wherein the memory comprises a plurality of look-up tables of weights, each of the plurality of look-up tables of weights associated with different values of a variable operable to control a level of compounding, the level operable to be selected within a range from and including a minimum to a maximum of the first and second data as a function of the variable, the range excluding values greater than the maximum and less than the minimum.

17. The system of claim 12 wherein the filter comprises an adder operable to sum the weighted first datum with the weighted second datum.

18. A method of compounding data representing a same spatial location, the method comprising:
    (a) weighting first and second data as a function of first and second weights, respectively, the first and second weights responsive to a first function that smoothly varies from a minimum value to a maximum value; and
    (b) compounding weighted first and second data;
    wherein the first and second data correspond to: different steering angles intersecting the spatial location, translation of a transducer between acquisitions data at different frequencies or differences in imaging parameters.

19. The method of claim 18 wherein (a) comprises weighting the first and second data, the first function smoothly varying from a zero value to a unity value as a first function of a difference between the first and second data, the first and second weights each responsive to both the first and second data.

20. The method of claim 18 wherein the first function comprises a Fermi-Dirac function.

21. The method of claim 18 wherein (a) comprises weighting with the first weight responsive to a first difference of the second datum from the first datum and weighting with the second weight responsive to a second difference of the first datum from the second datum.

22. The method of claim 18 further comprising:
    (c) selecting the first and second weights as a function of a variable, the variable operable to control a level of compounding, the level operable to be selected within a range from and including a minimum to a maximum of the first and second data as a function of the variable, the range excluding values greater than the maximum and less than the minimum.

23. The method of claim 22 wherein (c) comprises selecting the variable as a function of an imaging application.

24. The method of claim 18 further comprising:

c) weighting third data as a function of a third weight, wherein the first, second and third weights are each responsive to all of the first, second and third data;

wherein (b) comprises compounding the weighted first, second and third data.

25. The method of claim 18 wherein (b) comprises adding the weighted first datum with the weighted second datum.

26. A system for compounding ultrasound data representing a same spatial location, the system comprising:

a memory for storing first and second weights, the first and second weights responsive to a first function that varies smoothly from a zero value to a unity value;

a filter for weighting the first and second data with the first and second weights, respectively, and for compounding the weighted first and second data;

wherein the first and second data correspond to: different steering angles intersecting the spatial location, translation of a transducer between acquisitions, data at different frequencies or differences in imaging parameters.

27. The system of claim 26 wherein the memory has first and second inputs for receiving first arid second data, the first and second weights each responsive to both the first and second data.

28. The system of claim 26 wherein the first and second weights are each responsive to a difference between the first and second data.

29. The system of claim 26 wherein the memory comprises a look-up table of weights.

30. The system of claim 26 wherein the memory comprises a plurality of look-up tables of weights, each of the plurality of look-up tables of weights associated with different values of a variable operable to control a level of compounding within a range of averaging to selection of a maximum of the first and second data.

31. A method of compounding ultrasound data representing a same spatial location, the method comprising:

(a) selecting in response to user input a level of compounding, the level operable to be selected within a range from and including a minimum to a maximum of first and second data, the range excluding values greater than the maximum and less than the minimum; and (b) compounding the first and second data as a function of the level of compounding.

32. A method for compounding ultrasound data representing a same spatial location, the method comprising;

(a) weighting first and second data as a function of first and second weights, respectively, the first and second weights each a function of both the first and second data, the first and second weights being other than zero values; and (b) compounding weighted first and second data;

wherein the first and second weights are responsive to a function that varies smoothly from a zero value to a unity value as a first function of a difference between the first and second data, the first function comprising a Fermi-Dirac function.

33. A method for compounding ultrasound data representing a same spatial location, the method comprising:

(a) weighting first and second data as a function of first and second weights, respectively, the first and second weights each a function of both the first and second data, the first and second weights being other than zero values; and (b) compounding weighted first and second data;

wherein the first and second weights are responsive to a function that varies smoothly from a zero value to a unity value as a first function of a difference between the first and second data.

34. A method for compounding ultrasound data representing a same spatial location, the method comprising:

(a) weighting first and second data as a function of first and second weights, respectively, the first and second weights each a function of both the first and second data, the first and second weights being other than zero values; and (b) compounding weighted first and second data;

wherein (a) comprises weighting with the first weight responsive to a first difference of the second datum from the first datum and weighting with the second weight responsive to a second difference of the first datum from the second datum.

35. A method for compounding ultrasound data representing a same spatial location, the method comprising:

(a) weighting first and second data as a function of first and second weights, respectively, the first and second weights each a function of both the first and second data, the first and second weights being other than zero values;

(b) compounding weighted first and second data; and (c) selecting the first and second weights as a function of a variable, the variable operable to control a level of compounding, the level operable to be selected within a range from and including a minimum to a maximum of the first and second data as a function of the variable, the range excluding values greater than the maximum and less than the minimum.

36. A method of compounding data representing a same spatial location, die method comprising:

(a) weighting first and second data as a function of first and second weights, respectively, the first and second weights responsive to a first function that smoothly varies from a minimum value to a maximum value; and (b) compounding weighted first and second data;

wherein the first function comprises a Fermi-Dirac function.

* * * * *